(12) United States Patent
Kim et al.

(10) Patent No.: US 12,471,143 B2
(45) Date of Patent: Nov. 11, 2025

(54) CTS TRANSMISSION METHOD

(71) Applicant: LG ELECTRONICS INC., Seoul (KR)

(72) Inventors: Jeongki Kim, Seoul (KR); Jinsoo Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 346 days.

(21) Appl. No.: 17/999,314

(22) PCT Filed: Apr. 29, 2021

(86) PCT No.: PCT/KR2021/005476
§ 371 (c)(1),
(2) Date: Nov. 18, 2022

(87) PCT Pub. No.: WO2021/235730
PCT Pub. Date: Nov. 25, 2021

(65) Prior Publication Data
US 2023/0189340 A1  Jun. 15, 2023

(30) Foreign Application Priority Data
May 21, 2020 (KR) .................. 10-2020-0061056

(51) Int. Cl.
*H04W 74/0816* (2024.01)
*H04W 72/0446* (2023.01)
*H04W 84/12* (2009.01)

(52) U.S. Cl.
CPC ... *H04W 74/0816* (2013.01); *H04W 72/0446* (2013.01); *H04W 84/12* (2013.01)

(58) Field of Classification Search
CPC .......... H04W 74/0816; H04W 72/0446; H04W 84/12; H04L 5/0007; H04L 27/26
See application file for complete search history.

(56) References Cited

U.S. PATENT DOCUMENTS

2017/0311289 A1* 10/2017 Kim .................. H04W 74/0816
2018/0302858 A1* 10/2018 Son .................. H04W 52/0229
(Continued)

FOREIGN PATENT DOCUMENTS

| CN | 102595569 B | * 6/2014 | ........ H04W 74/0816 |
|---|---|---|---|
| KR | 2019-0065280 | 6/2019 | |

(Continued)

OTHER PUBLICATIONS

PCT International Application No. PCT/KR2021/005476, International Search Report dated Aug. 6, 2021, 4 page.
(Continued)

*Primary Examiner* — Chae S Lee
(74) *Attorney, Agent, or Firm* — LEE, HONG, DEGERMAN, KANG & WAIMEY

(57) ABSTRACT

In a Wireless Local Area Network system, a reception STA can receive a request to send (RTS) frame. The RTS frame may include bandwidth information. The reception STA can perform clear channel assessment (CCA) on the basis of the bandwidth information. The reception STA can determine a transmission channel on the basis of the result of the CCA and information about preset multiple resource units (MRUs). The reception STA can transmit a clear to send (CTS) frame through the transmission channel. The transmission channel is one of the preset MRUs and may be a channel in which the CCA result is idle. The preset MRUs may include a first MRU composed of a first 996 tone RU, a second 996 tone RU, a third 996 tone RU, and a 484 tone RU.

6 Claims, 14 Drawing Sheets

(56) References Cited

U.S. PATENT DOCUMENTS

| | | | |
|---|---|---|---|
| 2021/0337595 A1* | 10/2021 | Yong | H04W 72/0446 |
| 2021/0345403 A1* | 11/2021 | Kneckt | H04L 1/16 |
| 2023/0040899 A1* | 2/2023 | Seok | H04L 5/0094 |
| 2023/0051851 A1* | 2/2023 | Hu | H04L 5/0075 |

FOREIGN PATENT DOCUMENTS

| | | |
|---|---|---|
| KR | 10-2096031 | 4/2020 |
| WO | 2017-111567 | 6/2017 |
| WO | 2020-060145 | 3/2020 |

OTHER PUBLICATIONS

Au, "Specification Framework for TGbe," IEEE P802.11-19/1262r9, May 2020, 22 pages.

* cited by examiner (a)

(b)

* A: STA A, B: STA B

CTS TRANSMISSION METHOD

CROSS-REFERENCE TO RELATED APPLICATION(S)

This application is the National Stage filing under 35 U.S.C. 371 of International Application No. PCT/KR2021/005476, filed on Apr. 29, 2021, which claims the benefit of earlier filing date and right of priority to Korean Application No. 10-2020-0061056, filed on May 21, 2020, the contents of which are all hereby incorporated by reference herein in their entireties.

TECHNICAL FIELD

The present specification relates to a method of transmitting a clear-to-send (CTS) frame using a multiple resource unit (MRU) in a wireless local area network (WLAN) system.

BACKGROUND

A wireless local area network (WLAN) has been enhanced in various ways. For example, the Institute of Electrical and Electronics Engineers (IEEE) 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

In a wireless local area network (WLAN) system according to various embodiments, a receiving station (STA) may receive a request to send (RTS) frame. The RTS frame may include bandwidth information. The receiving STA may perform a clear channel assessment (CCA) based on the bandwidth information. The receiving STA may determine a transport channel based on the CCA result and information on preconfigured multiple resource units (MRUs). The receiving STA may transmit a clear-to-send (CTS) frame through the transport channel.

According to an example of the present specification, since the CTS can be transmitted using the M-RU combination actually used, unnecessary channel occupation by the CTS can be prevented. By matching the actual PPDU transmission resource with the CTS transmission resource, unnecessary channel interference caused by the CTS can be prevented.

BRIEF DESCRIPTION OF THE DRAWINGS

FIG. 13 is a diagram illustrating an embodiment of a method of operating a transmitting STA while

DETAILED DESCRIPTION

Figure 1:
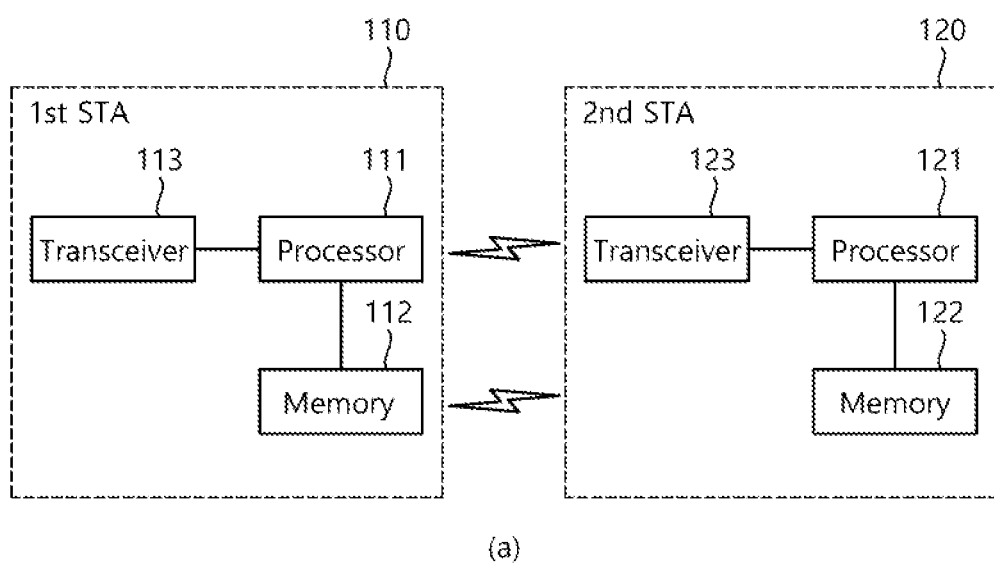
FIG. 1 shows an example of a transmitting apparatus and/or receiving apparatus of the present specification.
Figure 1:
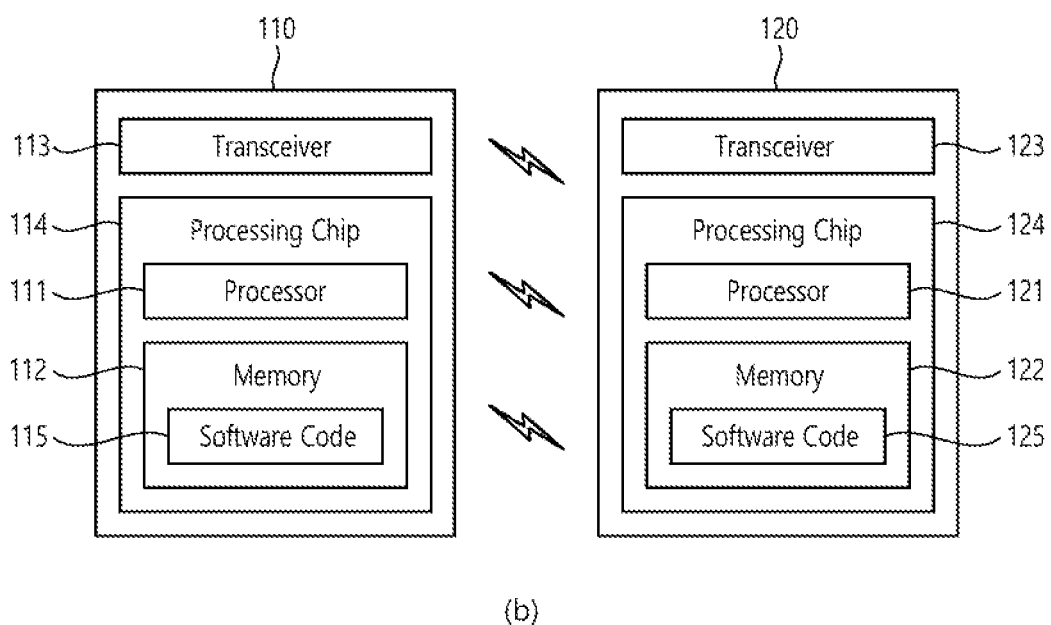

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/ decoding/encoding bit information of a sub-field (SIG, STF, LTF, Data) n a PPDU; 2) an operation of determining/ configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation for applied the and STA; 5) an operation related to determining/ obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/ receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/ signal or the like may be transmitted through the downlink.

Figure 2:
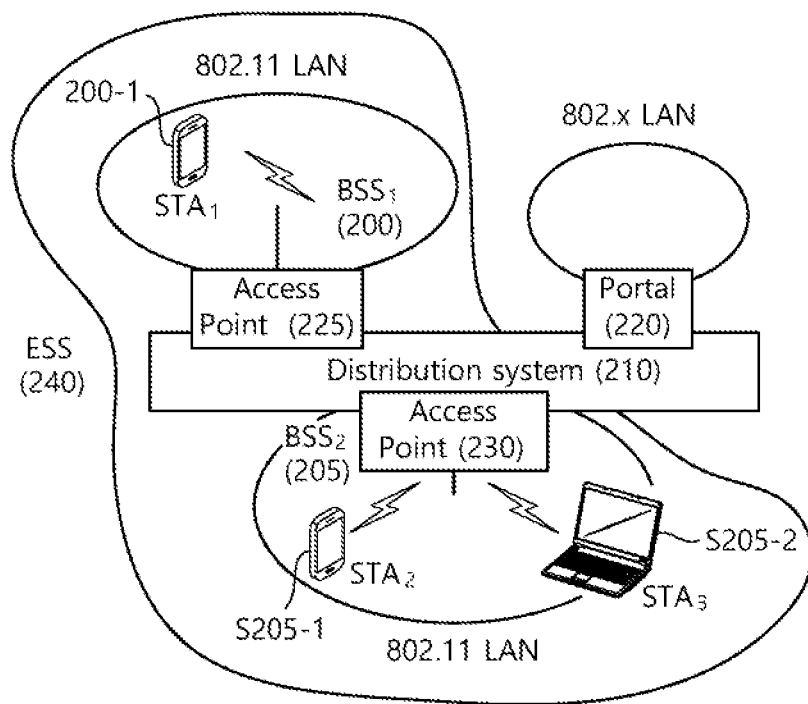
FIG. 2 is a conceptual view illustrating the structure of a wireless local area network (WLAN).
Figure 2:
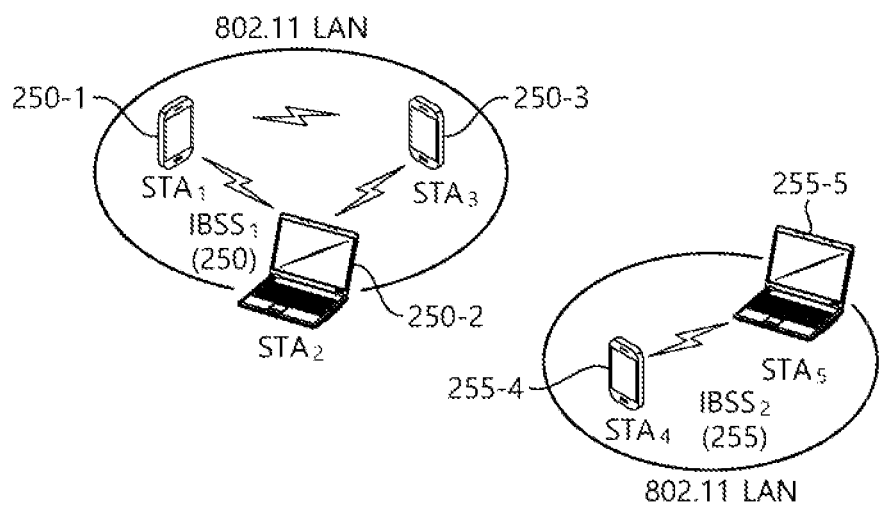

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
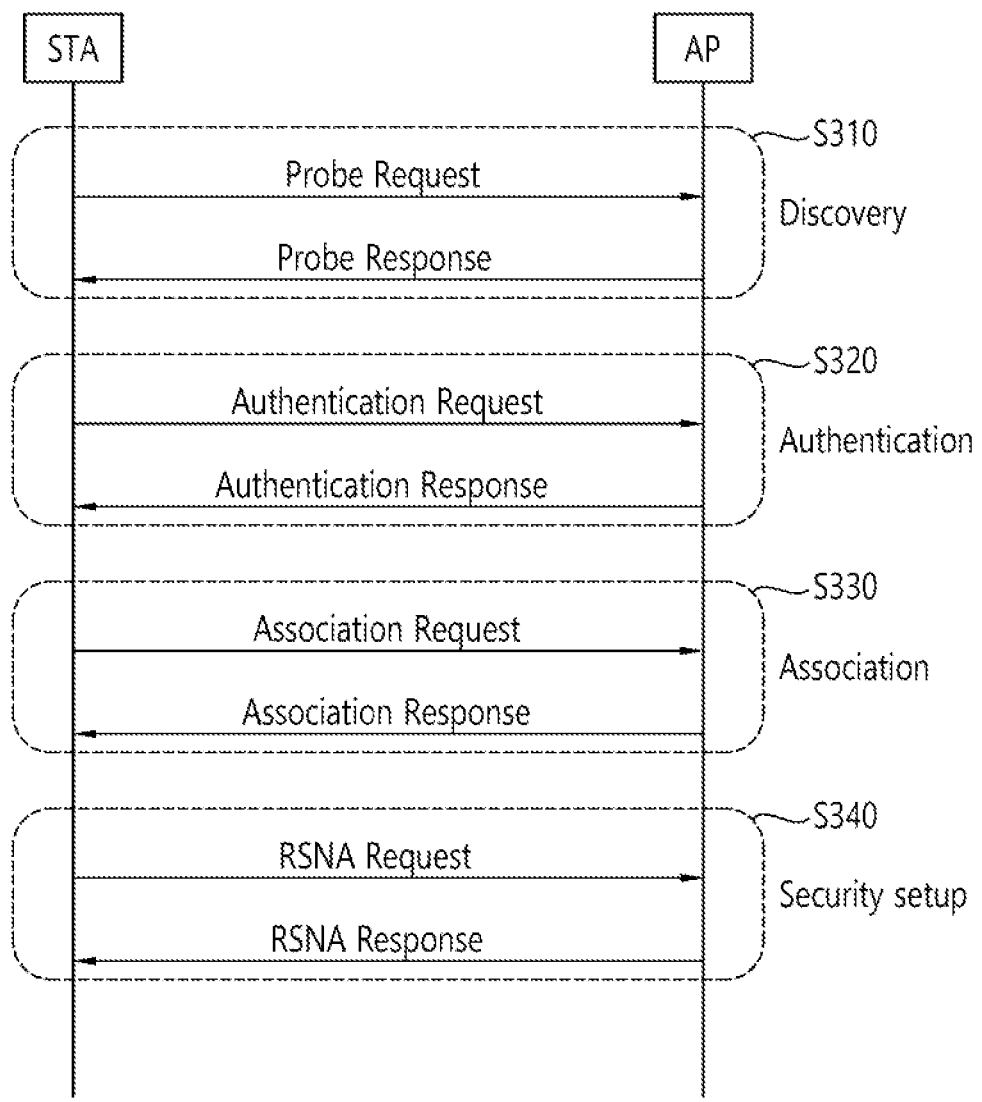
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
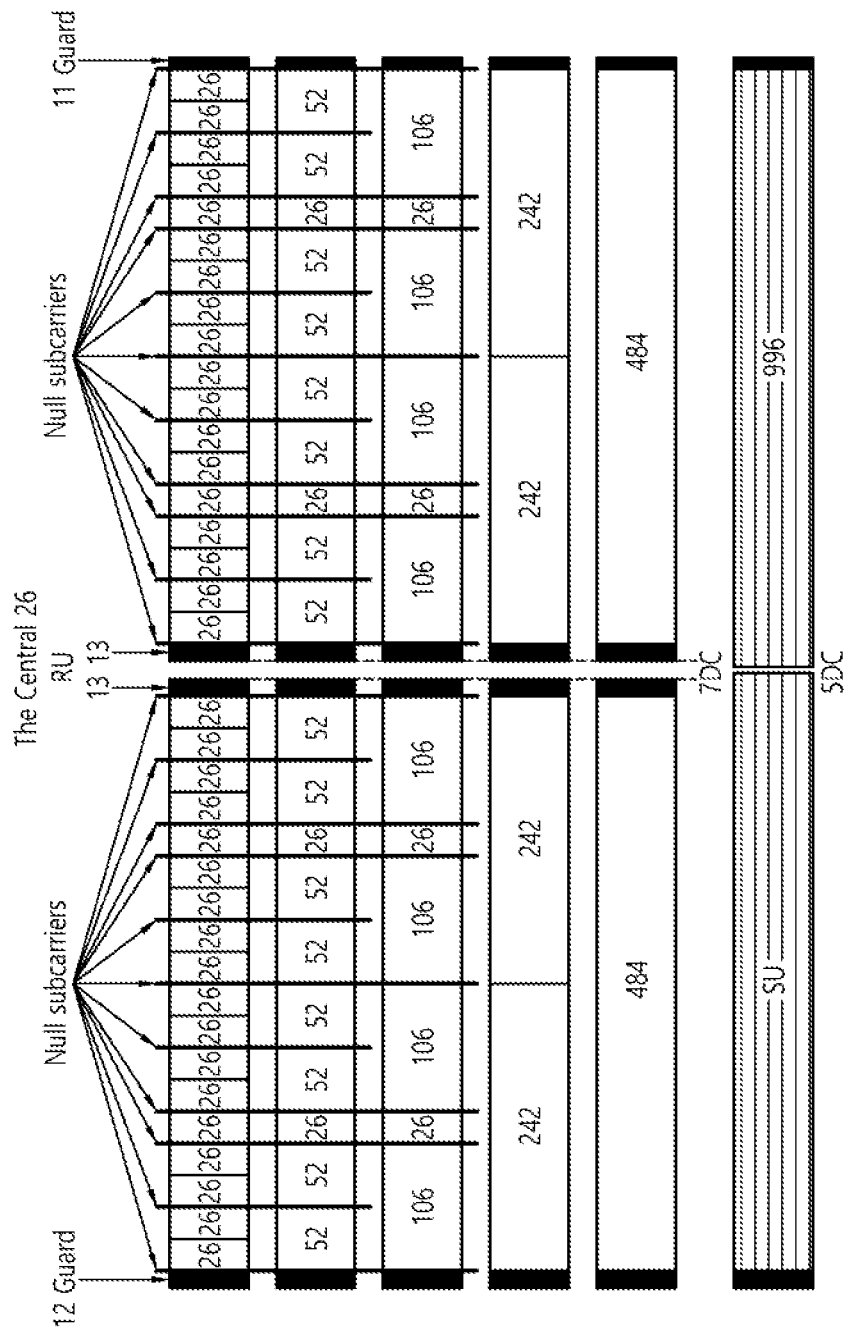
FIG. 4 illustrates a layout of resource units (RUs) used in a band of 80 MHz.

FIG. 4 illustrates a layout of resource units (RUs) used in a band of 80 MHz.

RUs having various sizes such as a 26-RU, a 52-RU, a 106-RU, a 242-RU, a 484-RU, a 996-RU may be used. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

Figure 7:
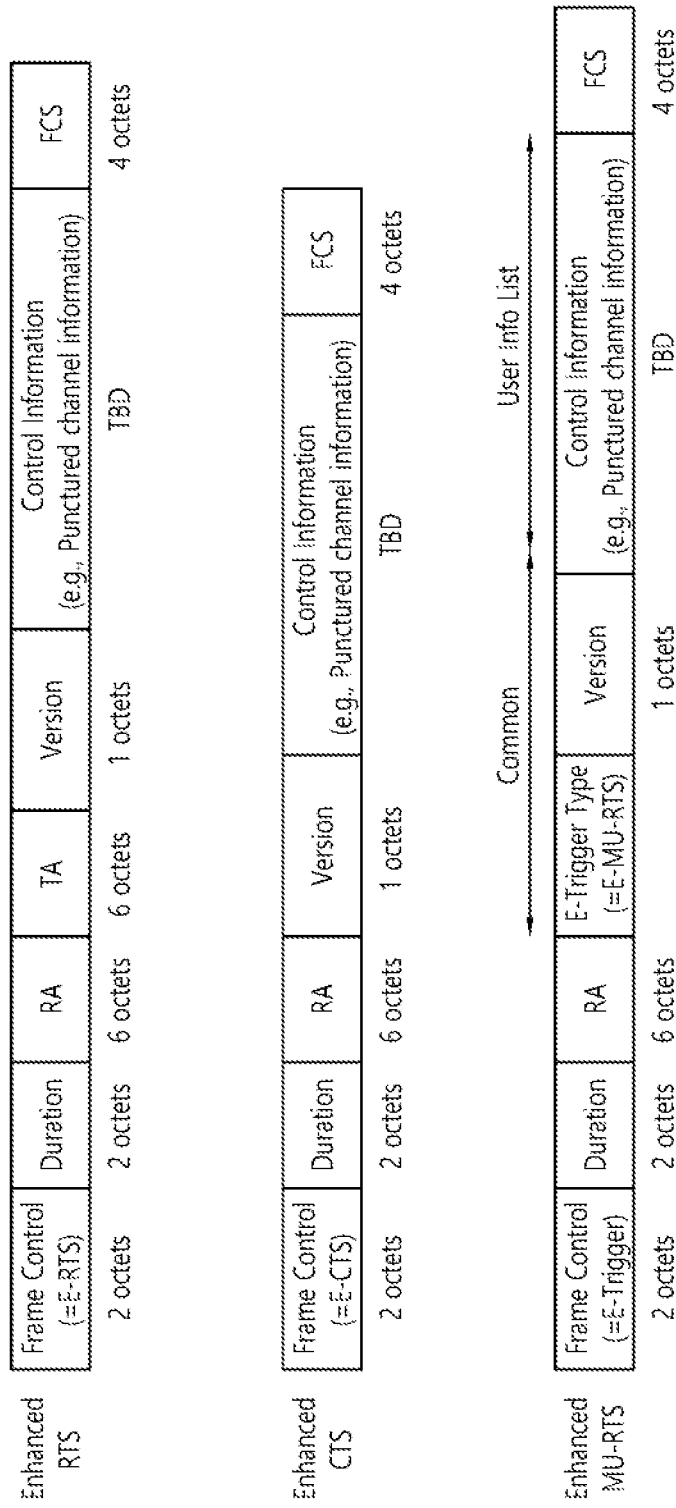
FIG. 7 is a diagram illustrating an embodiment of RTS, MU-RTS, and CTS frames.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Hereinafter, a PPDU transmitted/received in a STA of the present specification will be described.

Figure 5:
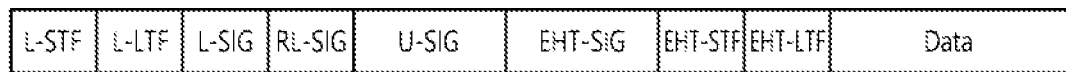
FIG. 5 illustrates an example of a PPDU used in the present specification.

FIG. 5 illustrates an example of a PPDU used in the present specification.

The PPDU of FIG. 5 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 5 may indicate the entirety or part of a PPDU type used in the EHT system. For example, the example of FIG. 5 may be used for both of a single-user (SU) mode and a multi-user (MU) mode. In other words, the PPDU of FIG. 5 may be a PPDU for one receiving STA or a plurality of receiving STAs. When the PPDU of FIG. 5 is used for a trigger-based (TB) mode, the EHT-SIG of FIG. 5 may be omitted. In other words, a STA which has received a trigger frame for uplink-MU (UL-MU) may transmit the PPDU in which the EHT-SIG is omitted in the example of FIG. 5.

In FIG. 5, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 5 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 5, the L-LTF and the L-STF may be the same as those in the conventional fields.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 5. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

The common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 6, each user field may be related to MU-MIMO allocation, or may be related to non-MU-MIMO allocation.

The common field of the EHT-SIG may include a CRC bit and a tail bit. A length of the CRC bit may be determined as 4 bits. A length of the tail bit may be determined as 6 bits, and may be set to '000000'.

The common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 5. The PPDU of FIG. 5 may be used to transmit/receive frames of various types. For example, the PPDU of FIG. 5 may be used for a control frame. An example of the control frame may include a request to send (RTS), a clear-to-send (CTS), a power save-poll (PS-poll), BlockACKReq, BlockAck, a null data packet (NDP) announcement, and a trigger frame. For example, the PPDU of FIG. 5 may be used for a management frame. An example of the management frame may include a beacon frame, a (re-) association request frame, a (re-) association response frame, a probe request frame, and a probe response frame. For example, the PPDU of FIG. 5 may be used for a data frame. For example, the PPDU of FIG. 5 may be used to simultaneously transmit at least two or more of the control frame, the management frame, and the data frame.

Figure 6:
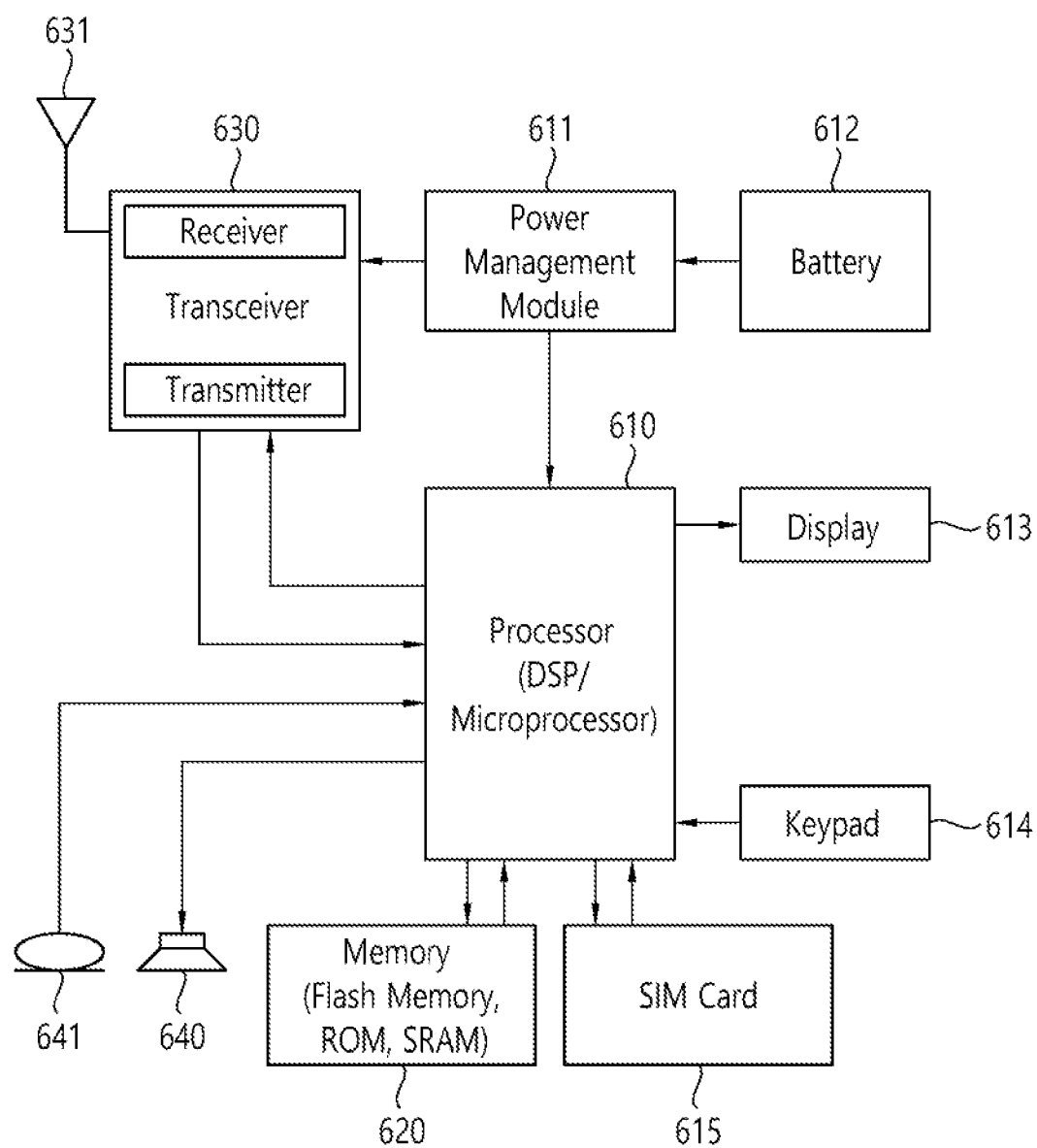
FIG. 6 illustrates an example of a modified transmission device and/or receiving device of the present specification.

FIG. 6 illustrates an example of a modified transmission device and/or receiving device of the present specification.

Each device/STA of the sub-figure (a)/(b) of FIG. 1 may be modified as shown in FIG. 6. A transceiver 630 of FIG. 6 may be identical to the transceivers 113 and 123 of FIG. 1. The transceiver 630 of FIG. 6 may include a receiver and a transmitter.

A processor 610 of FIG. 6 may be identical to the processors 111 and 121 of FIG. 1. Alternatively, the processor 610 of FIG. 6 may be identical to the processing chips 114 and 124 of FIG. 1.

A memory 620 of FIG. 6 may be identical to the memories 112 and 122 of FIG. 1. Alternatively, the memory 620 of FIG. 6 may be a separate external memory different from the memories 112 and 122 of FIG. 1.

Referring to FIG. 6, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 6, a speaker 640 may output a result related to a sound processed by the processor 610. A microphone 641 may receive an input related to a sound to be used by the processor 610.

<VHT RTS and CTS>

VHT and S1G RTS procedures (11ah)

A VHT STA transmitting an RTS frame sent in non-HT or non-HT redundant format and addressed to VHT STA should set the TA field to Bandwidth Signaling TA and set the TXVECTOR parameters, CH_BANDWIDTH_IN_NON_HT, and CH_BANDWIDTH to the same value. If the STA sending the RTS frame can do dynamic bandwidth operation, the STA dynamically sets the TXVECTOR parameter DYN_BANDWIDTH_IN_NON_HT. Otherwise, the STA should set the TXVECTOR parameter DYN_BANDWIDTH_IN_NON_HT to Static.

A VHT STA that starts TXOP by transmitting an RTS frame in which the TA field is set as the bandwidth signaling TA should not transmit the RTS frame to the non-VHT STA during the TXOP period.

Note: The non-VHT STA considers the bandwidth signal TA as the address of the TXOP holder. If the RTS frame is transmitted to the non-VHT STA during the TXOP initiated by the RTS frame with the bandwidth signaling TA, the non-VHT STA does not recognize the RTS sender as a TXOP holder.

CTS and DMG CTS Procedures

A STA that receives an RTS frame addressed to itself considers the NAV when deciding whether to respond with a CTS, unless the NAV is set by a frame originating from the STA transmitting the RTS frame (EDCA backoff procedure). "NAV indicates idle" means the NAV count being zero or a non-bandwidth signaling TA where the NAV count is non-zero.

It matches the TXOP holder address obtained from the TA field of the RTS frame. In the SIG STA (11ah), "NAV indicates idle state" means that both the NAV and RID counters are 0 or that the TA field of the RTS frame matches the stored TXOP holder address where the NAV or RID counter is not 0.

A VHT STA addressed by an RTS frame in a non-HT or non-HT redundant PPDU including bandwidth signal TA and RXVECTOR parameter DYN_BANDWIDTH_IN_NON_HT equal to static operates as follows.

When the RTS frame starts at the channel width indicated by the RXVECTOR parameter CH_BANDWIDTH_IN_NON_HT of the RTS frame for all secondary channels (secondary 20 MHz channel, secondary 40 MHz channel and secondary 80 MHz channel) where the CCA indicates idle state, the STA shall respond with a CTS frame delivered in a non-HT or non-HT redundant PPDU after SIFS. The TXVECTOR parameters CH_BANDWIDTH and CH_BANDWIDTH_IN_NON_HT of the CTS frame shall be set to the same value.

Otherwise, the STA does not respond with a CTS frame.

A VHT STA addressed by an RTS frame in a non-HT or non-HT redundant PPDU with a bandwidth signaling TA and an RXVECTOR parameter DYN_BANDWIDTH_IN_NON_HT equal to dynamic operates as follows.

When NAV indicates idle and when the RTS frame starts at channel width where the CCA is indicated by RXVECTOR parameter CH_BANDWIDTH_IN_NON_HT in RTS frame for all secondary channels (secondary 20 MHz Channel, secondary 40 MHz Channel, and secondary 80 MHz Channel), the STA should respond with a CTS frame delivered in a non-HT or non-HT redundant PPDU after SIFS. The TXVECTOR parameters CH_BANDWIDTH and CH_BANDWIDTH_IN_NON_HT of the CTS frame shall be set to the same value as the RXVECTOR parameter CH_BANDWIDTH_IN_NON_HT of the RTS frame. Otherwise, the STA does not respond with a CTS frame.

A VHT STA addressed by an RTS frame in a non-HT or non-HT redundant PPDU with a bandwidth signaling RXVECTOR TA and an parameter DYN_BANDWIDTH_IN_NON_HT equal to dynamic operates as follows.

If the NAV indicates idle, the STA should respond with a CTS frame in a non-HT or non-HT redundant PPDU after SIFS. The TXVECTOR parameters CH_BANDWIDTH and CH_BANDWIDTH_IN_NON_HT of the CTS frame indicate that the CCA of all secondary channels was idle for PIFS before the start of the RTS frame, it must be set to a channel width less than or equal to the channel width indicated in the RXVECTOR parameter of the RTS frame. The TXVECTOR parameters CH_BANDWIDTH and CH_BANDWIDTH_IN_NON_HT of the CTS frame shall be set to a channel width less than or equal to the channel width indicated in the RXVECTOR parameter of the RTS frame, when the CCA of all secondary channels was idle for PIFS before the start of the RTS frame. Otherwise, the STA does not respond with a CTS frame.

Non-VHT (11ah) and non-S1G STA addressed by RTS frame or VHT STA addressed by RTS frame carried in non-HT or non-HT redundant PPDU with non-bandwidth signaling TA or VHT STA addressed by the RTS frame in a format other than non-HT or non-HT overlap operate as follows.

If the NAV indicates an idle state, the STA shall respond with a CTS frame after SIFS. Otherwise, the STA does not respond with a CTS frame.

The RA field of the CTS frame shall be set to the non-bandwidth signaling TA obtained from the TA field of the RTS frame to which this CTS frame responds. The Duration field of the CTS frame is the duration field of the received RTS frame and is adjusted by subtracting aSIFS-Time and the number of microseconds required to transmit the CTS frame at the data rate determined by the rule.

After transmitting the RTS frame, the STA should wait for the CTSTimeout interval with aSIFSTime+aSlotTime+aRxPHYStartDelay value. This interval starts when the MAC receives the PHY-TXEND.confirm primitive. If the PHY-RXSTART.indication primitive does not occur during the CTSTimeout interval, the STA concludes that the transmission of the RTS frame has failed and this STA should invoke the backoff procedure when the CTSTimeout interval expires. If the PHY-RXSTART.indication primitive occurs during the CTSTimeout interval, the STA should wait for the corresponding PHY-RXEND.indication primitive to determine whether the RTS frame transmission was successful. Recognition of a valid CTS frame sent by the receiver of the RTS frame corresponding to this PHY-RXEND.indication primitive is interpreted as a successful response, allowing the frame exchange sequence to continue. Recognition of anything else, including other valid frames, is interpreted as RTS frame transmission failure. In this case, the STA may call the backoff procedure in the PHY-RXEND.indication primitive and process the received frame.

In the VHT (or later including it) system, since a bandwidth signaling is included in the RTS, the STA receiving the RTS can know the bandwidth the RTS is transmitted, when transmitting the CTS in response to the received RTS, if the STA with dynamic bandwidth support set to Static has an idle NAV and all secondary channels within the bandwidth indicated in the RTS frame are idle, after SIFS, CTS is responded to the corresponding channel, otherwise CTS is not responded. If NAV indicates idle, STA with dynamic bandwidth support set to Dynamic responds to CTS after SIFS, otherwise, it does not respond to the CTS. When responding to CTS, the channel bandwidth parameter of the CTS (that is, CTS frame's TXVECTOR parameters CH_BANDWIDTH and CH_BANDWIDTH_IN_NON_HT) is set equal to or smaller than the channel width indicated in the RXVECTPOR parameter in the RTS frame, the value at this time is set as the channel width for all secondary channels idle during PIFS before the start of RTS frame (that is, 20 MHz, 40 MHz, 80 MHz, 160 MHz/80+80 MHz).

In the CTS frame in the existing system, the channel width was designed without considering preamble puncturing. In this specification, an RTS/CTS frame exchange method considering preamble puncturing is proposed.

RTS, MU-RTS, and/or CTS newly defined herein may include preamble puncturing information.

FIG. 7 is a diagram illustrating an embodiment of RTS, MU-RTS, and CTS frames.

Referring to FIG. 7, RTS/CTS/MU-RTS may include punctured channel information. RTS/CTS/MU-RTS according to an example of the present specification may be defined as a frame including new information by updating an existing frame or a new frame. For example, the Version field or the E-Trigger Type field may or may not be included as described above in an optional form.

RTS/CTS/MU-RTS may be transmitted to the channel indicated by Punctured channel information. For example, the punctured channel information may be configured in the form of a bitmap, each bit may correspond to each 20 MHz channel in the entire bandwidth, and may include information about which 20 MHz channel is punctured or not. Accordingly, the STA may transmit RTS/MU-RTS/CTS through a non-punctured channel.

When transmitting the CTS after receiving the RTS, the existing UE may transmit the CTS through a channel indicated as idle in the band indicated by the RTS. As shown in Tables 1 to 4 below, since large RU combinations for non-OFDMA (that is, SU) are determined in 11be, transmitting CTS to a channel that is not actually used can create a situation that causes unnecessary channel occupation.

<Mode 1-1>Large RU combinations for non-OFDMA for each bandwidth in 11be (that is, large size MRU)

In 80 MHz non-OFDMA, a conditionally mandatory (that is, conditional on puncturing support) large-size RU combination (that is, MRU) as shown in Table 1 below may be supported.

Any 242-RU could be punctured (that is, any 242RU located anywhere could be punctured).

TABLE 1

| RU size | Aggregate BW | Notes |
| --- | --- | --- |
| 484 + 242 | 60 MHz | 4 options |

TABLE 1-continued

| RU size | Aggregate BW | Notes |
| --- | --- | --- |

In 160 MHz non-OFDMA, a conditionally mandatory (that is, conditional on puncturing support) large-size RU combination (that is, MRU) as shown in Table 2 below may be supported. Any 242-RU out of 8 242-RUs could be punctured (that is, any of the 8 cases in which a 242-RU is punctured is possible). Any 484-RU out of 4 484-RUs could be punctured (that is, any of the four cases in which 484 a RU are punctured is possible).

TABLE 2

| 80 MHz RU Size | 80 MHz RU size | Aggregate BW | Notes |
| --- | --- | --- | --- |
| 484 | 996 | 120 MHz | 4 options |
| 484 + 242 | 996 | 140 MHz | 8 options |

In 240 MHz non-OFDMA, a conditionally mandatory (that is, conditional on puncturing support) large-size RU combination (that is, MRU) as shown in Table 3 below may be supported. Any 484-RU out of 6 484-RUs can be punctured (that is, any of the 6 cases in which a 484-RU is punctured is possible). Any 996-RU out of three 996-RUs can be punctured (that is, any of the three cases in which a 996-RU is punctured is possible).

TABLE 3

| 80 MHz RU size | 80 MHz RU size | 80 MHz RU size | Aggregate BW | Notes |
| --- | --- | --- | --- | --- |
| 484 | 996 | 996 | 200 MHz | 6 options |
| — | 996 | 996 | 160 MHz | 3 options |

In 320 MHz non-OFDMA, a conditionally mandatory (that is, conditional on puncturing support) large-size RU combination (that is, MRU) as shown in Table 4 below may be supported. Any 484-RU out of 8 484-RUs can be punctured (that is, any case of 8 cases in which a 484-RU is punctured is possible). Any 996-RU out of 4 996-RUs can be punctured (that is, any of the four cases in which a 996-RU is punctured is possible).

TABLE 4

| 80 MHz RU size | 80 MHz RU size | 80 MHz RU size | 80 MHz RU size | Aggregate BW | Notes |
| --- | --- | --- | --- | --- | --- |
| 484 | 996 | 996 | 996 | 280 MHz | 8 options |
| — | 996 | 996 | 996 | 240 MHz | 4 options |

Therefore, when transmitting CTS in response to RTS reception, the UE may determine whether to respond to the CTS frame by considering the Large RU combinations (that is, MRU combinations) for each bandwidth as described above. That is, upon receiving the RTS, the UE may perform CCA for the bandwidth indicated by the RTS, if there is an MRU combination corresponding to the channel in the IDLE as a result of the CCA, the CTS may be transmitted through the resource corresponding to the MRU combination. Combination 1: When the UE receives an RTS frame transmitted with 320 MHz bandwidth or an MU-RTS frame indicating SU (that is, individually addressed), the UE may check whether the NAV is idle and can perform physical carrier sensing as below.

A. If the CTS frame includes 320 MHz bandwidth information, it may check the CCA of the combinations below.

Combination 1-1-1: Check whether channels for 4 996-RUs, that is, all channels belonging to 320 MHz, are idle. If idle, CTS is transmitted to all channels and the bandwidth of CTS frame is set to 320 MHz.

Combination 1-1-2: Channel punctured for one 484-RU of 8 484-RUs. For example, when within 320 MHz, one 20 MHz channel (that is, the channel corresponding to a 242-RU) is busy and the other channels are idle, or, when one 40 MHz channel (channel corresponding to a 484 RU) is busy and the other channels are idle, it may transmit the CTS frame to the remaining channels except for the corresponding 40 MHz channel (in case of 40 MHz, 40 MHz channel corresponding to a 484 RU, if 20 MHz channel is busy, 40 MHz channel corresponding to a 484-RU to which a 242-RU belongs), the CTS frame may include the punctured channel information (information on which 40 MHz channel is punctured, that is, transport channel information).

Combinations 1-1-3: Channels in which one of the 4 996-RUs is punctured. For example, if three or more 20 MHz channels in one 80 MHz segment within 320 MHz (that is, 20 MHz channels corresponding to three 242-RUs or 20 MHz channels corresponding to four 242-RUs) are busy and all three 80 MHz channels corresponding to the remaining three 996-RUS are idle, it may transmit the CTS frame to the remaining channels except for 80 MHz, which is in the busy state (that is, 80 MHz channel to which 3 242-RUs belong or 80 MHz channel to which 4 242-RUs belong), the bandwidth information of the CTS frame is set to 320 MHZ, and the CTS frame may include the punctured channel information (information about which 80 MHz channel is punctured).

B. If the CTS frame includes 240 MHz bandwidth information, it can check the CCA of the combinations below.

Combination 1-2-1: Channels corresponding to 3 996-RUs. That is, it can be checked whether all channels belonging to 240 MHz are idle. If all channels are idle, CTS can be transmitted to all channels in the entire 240 MHz bandwidth, and the bandwidth information of the CTS frame can be set to 240 MHz.

Combination 1-2-2: Punctured channel for one 484-RU out of six 484-RUs. That is, if one 20 MHz channel (that is, the channel corresponding to a 242-RU) is busy within 240 MHz and the remaining channels are idle, or if one 40 MHz channel (corresponding to a 484 RU) is busy and the other channels are idle, the CTS frame may be transmitted through the remaining channels except for the corresponding 40 MHz channel (in case of 40 MHz, 40 MHz channel corresponding to a 484 RU, if 20 MHz channel is busy, 40 MHz channel corresponding to a 484-RU to which a 242-RU belongs). The bandwidth of the CTS frame may be set to 240, and the CTS frame may include the punctured channel information (indicating which 40 MHz channel is punctured).

Combination 1-2-3: Channels with one of three 996-RUs punctured. That is, if three or more 20 MHz channels in one 80 MHz segment (that is, three 20 MHz channels corresponding to three 242-RUs or four 20 MHz channels corresponding to four 242-RUs) are busy within 240 MHz, and two 80 MHz channels corresponding to the remaining two 996-RUs are all idle, the CTS frame can be transmitted on the remaining channels except for the 80 MHz indicating busy (that is, 80 MHz channel to which channels corresponding to 3 busy 242-RUs belong or 80 MHz channel to which channels corresponding to 4 busy 242-RUs belong). The bandwidth information of the CTS frame may be set to 240 MHZ, and the CTS frame may include the punctured channel information (indicating which 80 MHz channel is punctured).

C. If the CTS frame includes 160 MHz bandwidth information, it may check the CCA of the combinations below.

Combination 1-3-1: Channels corresponding to two 996-RUs. That is, it is checked whether all channels belonging to 160 MHz are idle. If all channels are idle, the CTS is transmitted to all channels in the entire 160 MHz bandwidth, and the bandwidth information of a CTS frame is set to 160 MHz.

Combination 1-3-2: Punctured channel for one 242-RU out of 8 242-RUs. That is, if one 20 MHz channel (that is, the channel corresponding to a 242-RU) is busy within 160 MHz and the other channels are idle, the CTS frame is transmitted to the remaining channels except for the 20 MHz channel (that is, the 20 MHz channel corresponding to the 242-RUs), and the bandwidth is set to 160 in the CTS frame and the punctured channel information (indicating which 20 MHz channel is punctured) is transmitted by being included in the CTS frame.

Combination 1-3-3: Channels in which one of the four 484-RUs is punctured. That is, if one 40 MHz channel (that is, two 20 MHz channels corresponding to two 242-RUs or one 40 MHz channel corresponding to one 484 RU) is busy within 160 MHz and all three 40 MHz channels corresponding to the remaining three 484-RUS (that is, a 40 MHz channel corresponding to one 484-RU+an 80 MHz channel corresponding to one 996-RU) are idle, the CTS frame can be transmitted on the remaining channels (that is, a 40 MHz channel corresponding to one 484-RU+an 80 MHz channel corresponding to one 996-RU) except for the corresponding 40 MHz indicating busy (that is, two 20 MHz channels corresponding to two 242-RUs or one 40 MHz channel corresponding to one 484 RU). The bandwidth information of the CTS frame may be set to 160 MHZ, and the CTS frame may include the punctured channel information (indicating which 40 MHz channel is punctured).

D. If the CTS frame is transmitted with 80 MHz bandwidth information, it can check the CCA of the combinations below.

Combination 1-4-1: A channel corresponding to one 996-RU. That is, it can be checked whether all channels belonging to 80 MHz are idle. If all channels are idle, CTS is transmitted to all channels in the entire 80 MHz bandwidth, and the bandwidth information of a CTS frame is set to 80 MHz.

Combination 1-4-2: Channel punctured for one 242-RU out of four 242-RUs. That is, if one 20 MHz channel (that is, the channel corresponding to a 242-RU) is busy within 80 MHz and the remaining channels are idle, the CTS frame may be transmitted through the remaining channels except for the corresponding 20 MHz channel (that is, the 20 MHz channel corresponding to the corresponding a 242-RU). The bandwidth is set to 160 in the CTS frame, and the punctured channel information (indicating which 20 MHz channel is punctured) is transmitted by being included in the CTS frame.

Combination 2: When the UE receives an RTS frame transmitted with bandwidth information set to 240 MHz or an MU-RTS frame indicating SU (that is, individually addressed), it checks whether the NAV is idle and performs physical carrier sensing as follows.

A. If the CTS frame is transmitted with 240 MHz bandwidth information, it can check the CCA of the combinations below.

Combination 2-1-1: Channels corresponding to three 996-RUs. That is, it checks whether all channels belonging to 240 MHz are idle. If all channels are idle, CTS is transmitted to all channels in the entire 240 MHz bandwidth, and the bandwidth information of a CTS frame is set to 240 MHz.

Combination 2-1-2: Punctured channel for one 484-RU out of six 484-RUs. That is, if one 20 MHz channel (that is, the channel corresponding to a 242-RU) is busy within 240 MHz and the remaining channels are idle, or if one 40 MHz channel (corresponding to a 484 RU) is busy and the other channels are idle, the CTS frame may be transmitted through the remaining channels except for the corresponding 40 MHz channel (in case of 40 MHz, 40 MHz channel corresponding to a 484 RU, if 20 MHz channel is busy, 40 MHz channel corresponding to a 484-RU to which a 242-RU belongs). The bandwidth of the CTS frame may be set to 240, and the CTS frame may include the punctured channel information (indicating which 40 MHZ channel is punctured).

Combination 2-1-3: Channels with one of three 996-RUs punctured. That is, if three or more 20 MHz channels in one 80 MHz segment (that is, three 20 MHz channels corresponding to three 242-RUs or four 20 MHz channels corresponding to four 242-RUs) are busy within 240 MHz, and two 80 MHz channels corresponding to the remaining two 996-RUs are all idle, the CTS frame can be transmitted on the remaining channels except for the 80 MHz indicating busy (that is, 80 MHz channel to which channels corresponding to 3 busy 242-RUs belong or 80 MHz channel to which channels corresponding to 4 busy 242-RUs belong). The bandwidth information of the CTS frame may be set to 240 MHZ, and the CTS frame may include the punctured channel information (indicating which 80 MHz channel is punctured).

B. If the CTS frame is transmitted with 160 MHz bandwidth information, it can check the CCA of the combinations below.

Combination 2-2-1: Channels corresponding to two 996-RUs. That is, it is checked whether all channels belonging to 160 MHz are idle. If all channels are idle, the CTS is transmitted to all channels in the entire 160 MHz bandwidth, and the bandwidth information of a CTS frame is set to 160 MHz.

Combination 2-2-2: Channel punctured for one 242RU of 8 242-RUs. That is, if one 20 MHz channel (that is, the channel corresponding to a 242-RU) is busy within 160 MHz and the other channels are idle, the CTS frame may be transmitted through the remaining channels except for the corresponding 20 MHz channel (that is, the 20 MHz channel corresponding to the corresponding a 242-RU). The bandwidth of the CTS frame may be set to 160, and the CTS frame may include the punctured channel information (indicating which 20 MHz channel is punctured).

Combination 2-2-3: Channels in which one of the four 484-RUs is punctured. That is, if one 40 MHz channel (that is, two 20 MHz channels corresponding to two 242-RUs or one 40 MHz channel corresponding to one 484 RU) is busy within 160 MHz and all three 40 MHz channels corresponding to the remaining three 484-RUS (that is, a 40 MHz channel corresponding to one 484-RU+an 80 MHz channel corresponding to one 996-RU) are idle, the CTS frame can be transmitted through the remaining channels (that is, a 40 MHz channel corresponding to one 484-RU+an 80 MHz channel corresponding to one 996-RU) except for the corresponding 40 MHz indicating busy (that is, two 20 MHz channels corresponding to two 242-RUs or one 40 MHz channel corresponding to one 484 RU). The bandwidth information of the CTS frame may be set to 160 MHZ, and the CTS frame may include the punctured channel information (indicating which 40 MHz channel is punctured).

C. If the CTS frame is transmitted with 80 MHz bandwidth information, it can check the CCA of the combinations below.

Combination 2-3-1: A channel corresponding to one 996-RU. That is, it is checked whether all channels belonging to 80 MHz are idle. If all channels are idle, the CTS is transmitted to all channels in the entire 80 MHz bandwidth, and the bandwidth information of a CTS frame is set to 80 MHz.

Combination 2-3-2: Channel punctured for one 242RU out of four 242-RUs. In other words, if one 20 MHz channel (that is, the channel corresponding to a 242-RU) is busy within 80 MHz and the other channels are idle, the CTS frame may be transmitted through the remaining channels except for the corresponding 20 MHz channel (that is, the 20 MHz channel corresponding to the corresponding a 242-RU). The bandwidth of the CTS frame may be set to 160, and the CTS frame may include the punctured channel information (indicating which 20 MHz channel is punctured).

Combination 3: When the UE receives an RTS frame transmitted with bandwidth information set to 160 MHz or an MU-RTS frame indicating SU (that is, individually addressed), it checks whether the NAV is idle, and performs physical carrier sensing as follows.

A. If the CTS frame is transmitted with 160 MHz bandwidth information, it can check the CCA of the combinations below.

Combination 3-1-1: Channels corresponding to two 996-RUs. That is, it is checked whether all channels belonging to 160 MHz are idle. If all channels are idle, the CTS is transmitted to all channels in the entire 160 MHz bandwidth, and the bandwidth information of a CTS frame is set to 160 MHz.

Combination 3-1-2: Channel punctured for one 242RU of 8 242-RUs. That is, if one 20 MHz channel (that is, the channel corresponding to a 242-RU) is busy within 160 MHz and the other channels are idle, the CTS frame may be transmitted through the remaining channels except for the corresponding 20 MHz channel (that is, the 20 MHz channel corresponding to the corresponding a 242-RU). The bandwidth of CTS frame can be set to 160 and the CTS frame may include the punctured channel information (indicating which 20 MHz channel is punctured).

Combination 3-1-3: Channels in which one of the four 484-RUs is punctured. That is, if one 40 MHz channel (that is, two 20 MHz channels corresponding to two 242-RUs or one 40 MHz channel corresponding to one 484 RU) is busy within 160 MHz and all three 40 MHz channels corresponding to the remaining three 484-RUs (that is, a 40 MHz channel corresponding to one 484-RU+an 80 MHz channel corresponding to one 996-RU) are idle, the CTS frame can be transmitted on the remaining channels (that is, a 40 MHz channel corresponding to one 484-RU+an 80 MHz channel corresponding to one 996-RU) except for the corresponding 40 MHz indicating busy (that is, two 20 MHz channels corresponding to two 242-RUs or one 40 MHz channel corresponding to one 484 RU). The bandwidth information of the CTS frame may be set to 160 MHz, and the CTS frame may include the punctured channel information (indicating which 40 MHz channel is punctured).

B. If the CTS frame is transmitted with 80 MHz bandwidth information, it checks the CCA of the combinations below.

Combination 3-2-1: A channel corresponding to one 996-RU. That is, it is checked whether all channels belonging to 80 MHz are idle. If all channels are idle, the CTS is transmitted to all channels in the entire 80 MHz bandwidth, and the bandwidth information of a CTS frame is set to 80 MHz.

Combination 3-2-2: Channel punctured for one 242RU out of four 242-RUs. In other words, if one 20 MHz channel (that is, the channel corresponding to a 242-RU) is busy within 80 MHz and the other channels are idle, the CTS frame may be transmitted through the remaining channels except for the corresponding 20 MHz channel (that is, the 20 MHz channel corresponding to the corresponding a 242-RU). The bandwidth of the CTS frame may be set to 160, and the CTS frame may include the punctured channel information (indicating which 20 MHz channel is punctured).

Combination 4: When the UE receives an RTS frame transmitted with bandwidth information set to 80 MHz or an MU-RTS frame indicating SU (that is, individually addressed), it checks whether the NAV is idle, and performs physical carrier sensing as follows.

If the CTS frame is transmitted with 80 MHz bandwidth information, it can check the CCA of the combinations below.

Combination 4-1-1: A channel corresponding to one 996-RU. That is, it is checked whether all channels belonging to 80 MHz are idle. If all channels are idle, the CTS is transmitted to all channels in the entire 80 MHz bandwidth, and the bandwidth information of a CTS frame is set to 80 MHz.

Combination 4-1-2: Channel punctured for one 242RU out of four 242-RUs. In other words, if one 20 MHz channel (that is, the channel corresponding to a 242-RU) is busy within 80 MHz and the other channels are idle, the CTS frame may be transmitted through the remaining channels except for the corresponding 20 MHz channel (that is, the 20 MHz channel corresponding to the corresponding a 242-RU). The bandwidth of the CTS frame may be set to 160, and the CTS frame may include the punctured channel information (indicating which 20 MHz channel is punctured).

The above combinations indicate that the NAV is idle and that the CTS is transmitted using the largest bandwidth among Large RU combinations among idle channels as a result of the CCA check. That is, the UE may transmit the CTS frame through the channel corresponding to the largest MRU combination among idle channels.

Figure 8:
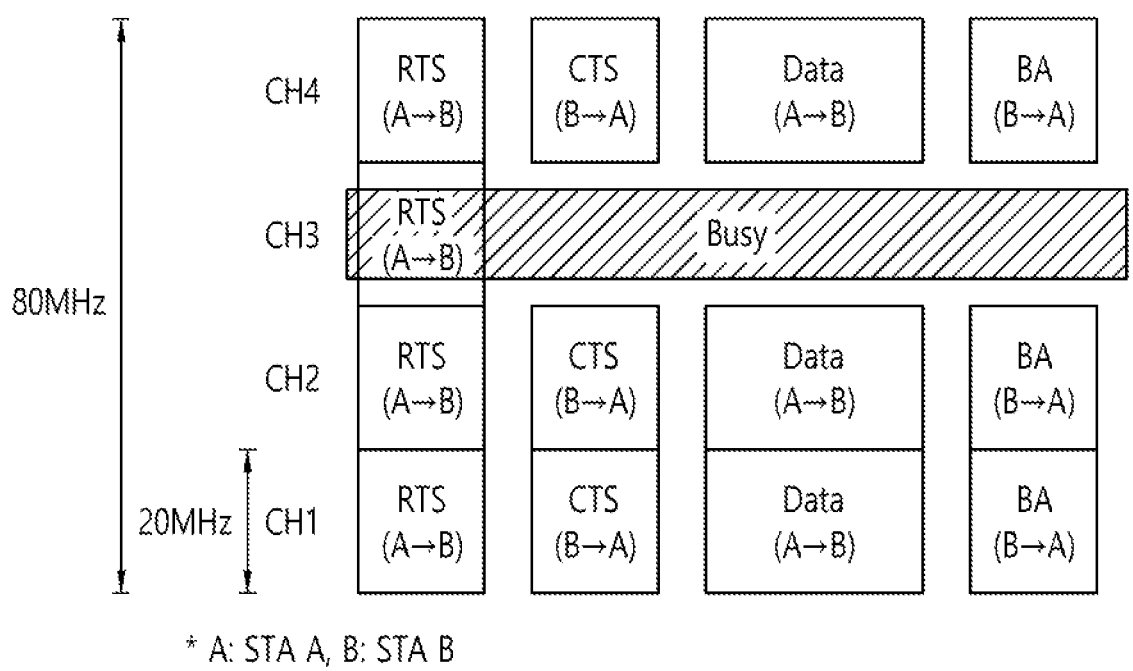
FIGS. 8 to 11 is a diagram illustrating an embodiment of a method for the CTS transmission.

FIG. 8 is a diagram illustrating an embodiment of a method for the CTS transmission.

Referring to FIG. 8, STA A may transmit an RTS to STA B as a non-HT duplication PPDU through an 80 MHz bandwidth. STA B may receive the RTS. Since STA B can perform CCA and CH3 is busy, the CTS frame can be transmitted to STA A in the form of a non-HT duplication PPDU through CH1, 2 and CH3, which are a 484-RU+a 242-RU, which is the largest Large RU combination (that is, MRU) except for CH3".

Figure 9:
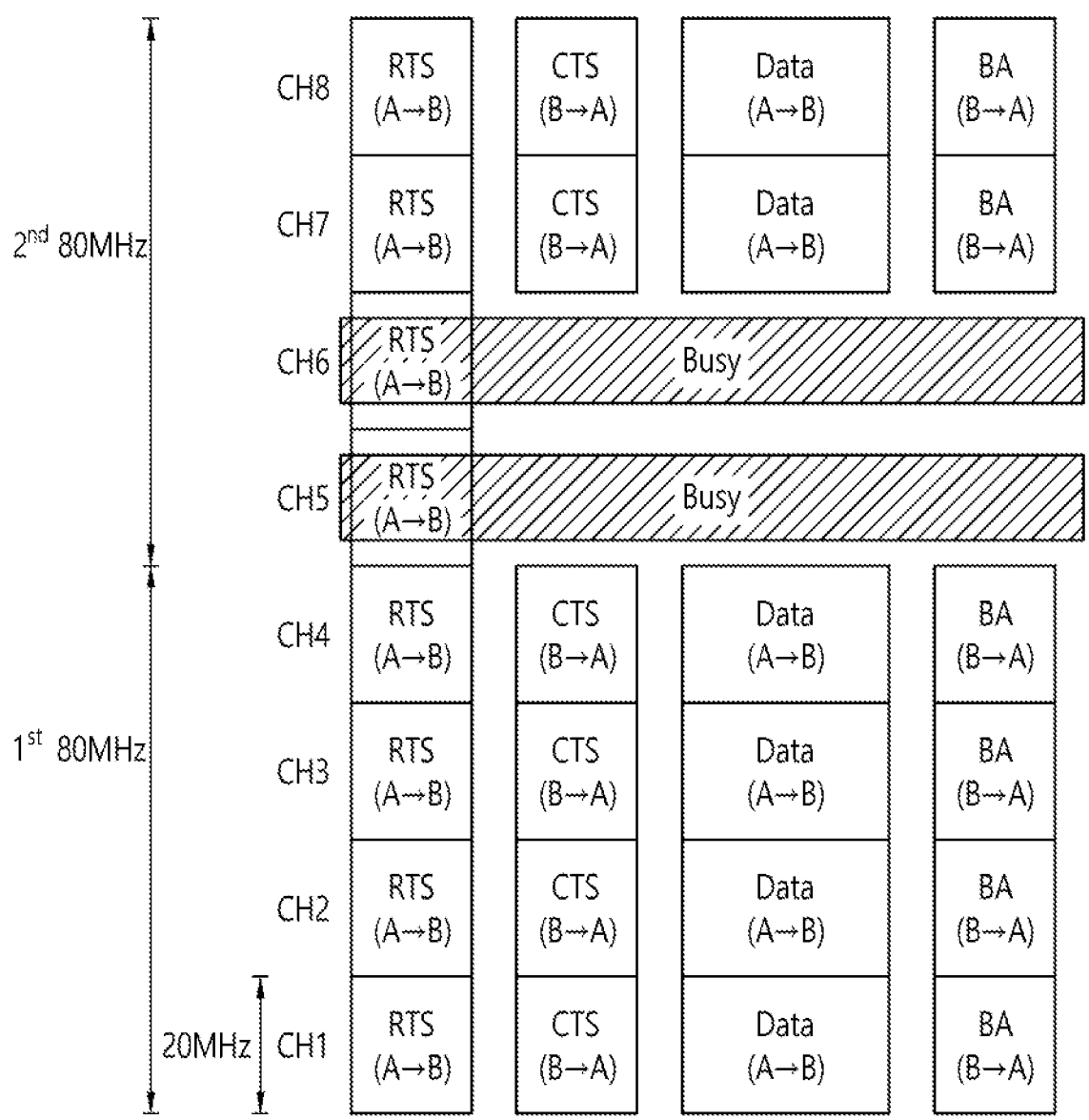

FIG. 9 is a diagram illustrating an embodiment of a method for a CTS transmission.

Referring to FIG. 9, STA A may transmit the RTS to STA B as a non-HT duplication PPDU through a 160 MHz bandwidth. STA B may receive the RTS. STA B can perform CCA. Since CH5 and 6 are busy, and the remaining channels are idle, idle channels are included in the above-mentioned combination of a 996-RU+a 484 RU. Therefore, STA B can transmit the CTS frame to STA A in the form of a non-HT duplication PPDU through CH1, 2, 3, 4 and CH7, 8, which are a 996-RU+a 484 RU, which is the largest Large RU combination except for CH5 and 6.

When the UE receives RTS or MU-RTS, after examining combinations of Large RU combinations considering preamble puncturing for each bandwidth, if the CCA result, that is, idle channels measured through CCA, is not mapped in any of the Large RU combinations, even if there is an idle channel, the UE does not respond to CTS.

Figure 10:
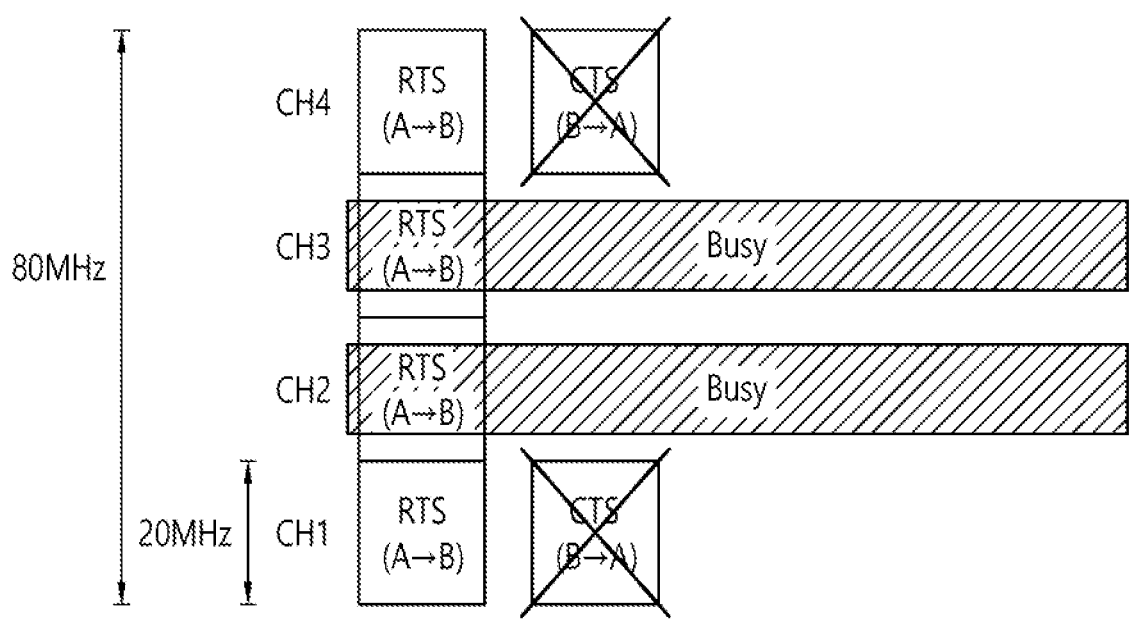

FIG. 10 is a diagram illustrating an embodiment of a method for the CTS transmission.

Referring to FIG. 10, STA A may transmit an RTS to STA B as a non-HT duplication PPDU through an 80 MHz bandwidth. STA B may receive the RTS. STA B may perform CCA. CH2 and CH3 are busy and CH1 and CH4 are idle. Since there is no MRU combination corresponding to CH1 and CH4, instead of transmitting CTS to CH1 and CH4, CTS is not transmitted using CH1 and CH4. Instead, if CH1 is the primary channel (primary 20), STA B may transmit a CTS through CH1.

Figure 11:
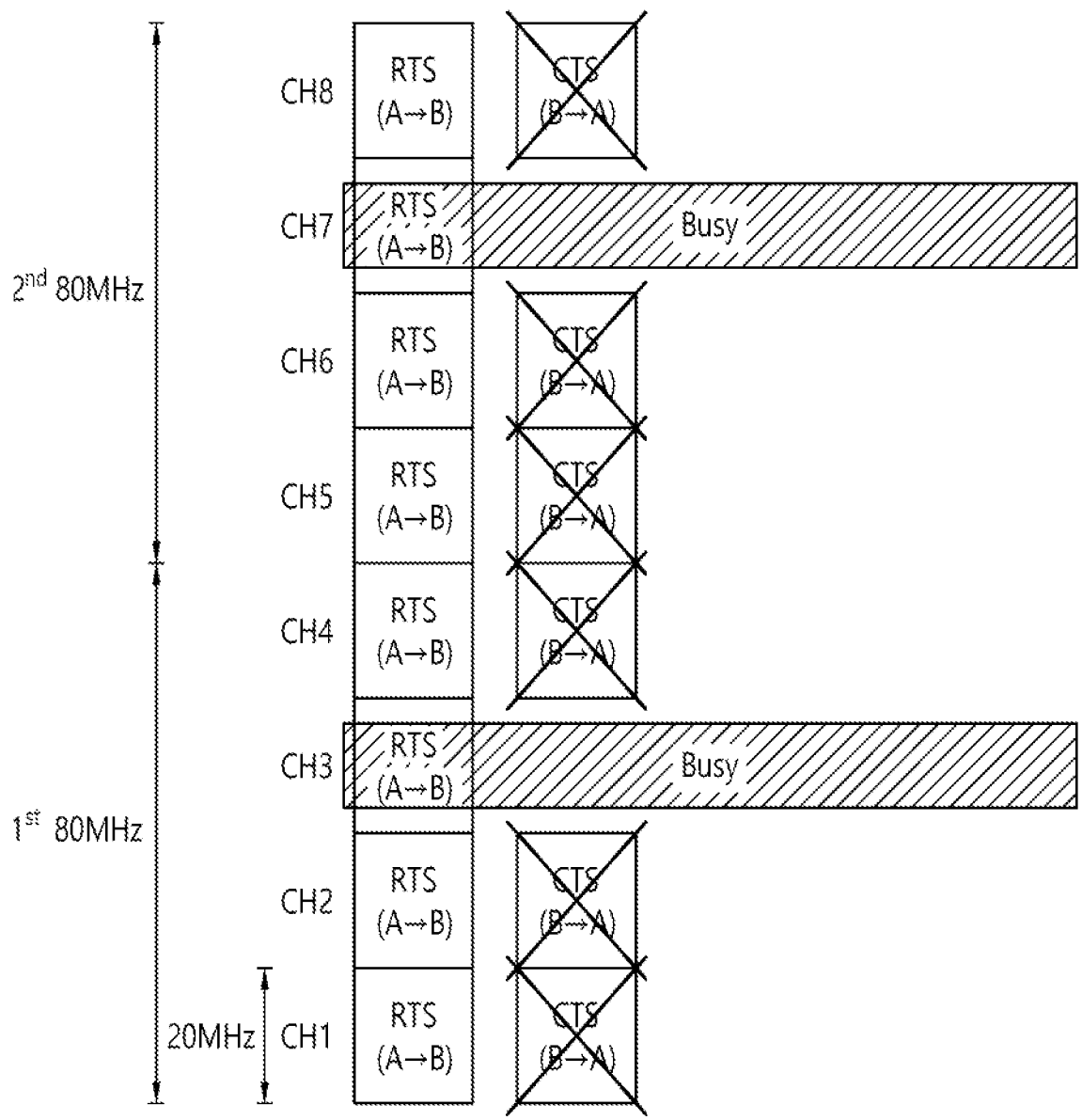

FIG. 11 is a diagram illustrating an embodiment of a method for the CTS transmission.

Referring to FIG. 11, STA A may transmit the RTS to STA B as a non-HT duplication PPDU through a 160 MHz bandwidth. STA B may receive the RTS. STA B may perform CCA, Since CH3 and 7 are busy and the remaining channels are idle, but there is no Large RU combination (that is, within combination 3) consisting of the remaining channels, the CTS may not be transmitted on the remaining channels (that is, CH1, 2, 4, 5, 6, and 8). Instead, STA B may transmit CTS through CH1 and CH2 if one of CH1 and CH2 is a primary channel (primary 20) and CH1 and CH2 are configured as primary 40 (that is, Primary 20+Secondary 20).

According to an example of the present specification, the condition for transmitting the CTS in response to the RTS/MU-RTS assumes that the NAV is not set (that is, the NAV value is 0) other than the above-mentioned conditions in which the channels are idle. This is already a conventional operation of a UE in a wireless LAN.

Figure 12:
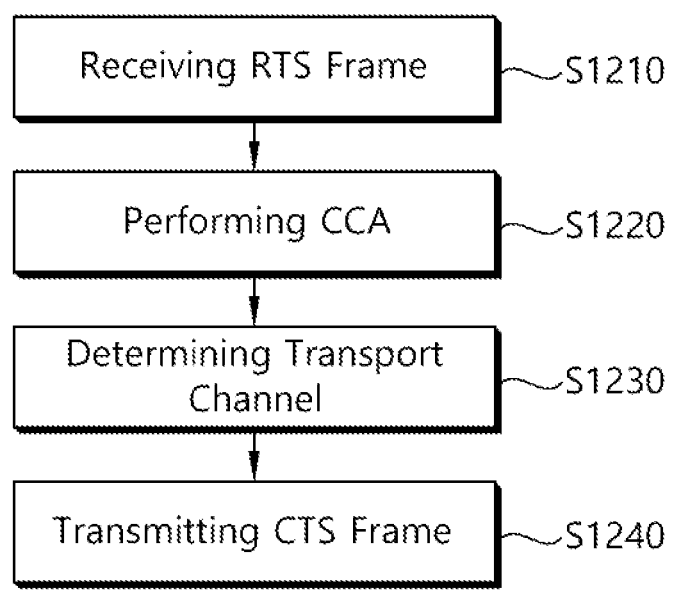
FIG. 12 is a diagram illustrating an embodiment of a method of operating a receiving STA.

FIG. 12 is a diagram illustrating an embodiment of a method of operating a receiving STA.

Referring to FIG. 12, a receiving STA may receive an RTS frame (S1210). For example, the receiving STA may receive a request to send (RTS) frame, and the RTS frame may include bandwidth information.

The receiving STA may perform CCA (S1220). For example, the receiving STA may perform a clear channel assessment (CCA) based on the bandwidth information.

The receiving STA may determine a transport channel (S1230). For example, the receiving STA may determine a transport channel based on the results of the CCA and information on preconfigured multiple resource units (MRUs).

The receiving STA may transmit a CTS frame (S1240). For example, the receiving STA may transmit a clear-to-send (CTS) frame through the transport channel.

For example, the transport channel may be one of the preconfigured MRUs, the transport channel may be a channel in which the result of the CCA is an idle state, and the RTS frame may further include information on a punctured channel.

For example, the preconfigured MRUs may include a first MRU consisting of a first 996 tone RU, a second 996 tone RU, a third 996 tone RU, and a 484 tone RU.

For example, the preconfigured MRUs may include a second MRU consisting of a first 996 tone RU, a second 996 tone RU, and a third 996 tone RU.

For example, the preconfigured MRUs may include a third MRU consisting of a first 996 tone RU, a second 996 tone RU, and a 484 tone RU.

For example, the preconfigured MRUs may include a fourth MRU consisting of a 996 tone RU, a 484 tone RU, and a 242 tone RU.

For example, the preconfigured MRUs may include a fifth MRU consisting of a 996 tone RU and a 484 tone RU.

For example, the preconfigured MRUs may include a sixth MRU consisting of a 484 tone RU and a 242 tone RU.

For example, the preconfigured MRUs may be a combination of RUs related to combinations 1 to 4 described above.

For example, the operation of the receiving STA may be based on FIGS. 8 to 11.

Figure 13:
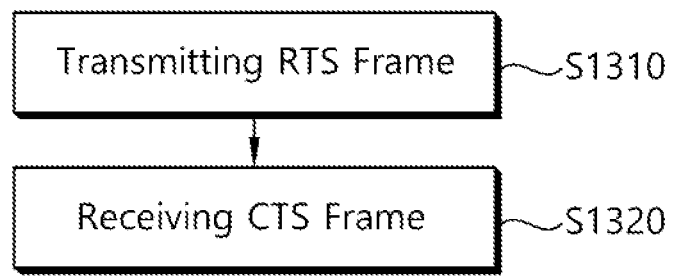

FIG. 13 is a diagram illustrating an embodiment of a method of operating a transmitting STA.

Referring to FIG. 13, a transmitting STA may transmit an RTS frame (S1310). For example, the transmitting STA may transmit a request to send (RTS) frame, and the RTS frame may include the bandwidth information.

The transmitting STA may receive the CTS frame (S1320). For example, the transmitting STA receives a clear-to-send (CTS) frame through a transport channel, and the transport channel may be determined based on results of a clear channel assessment (CCA) and information on preconfigured multiple resource units (MRUs).

Some of the detailed steps shown in the example of FIGS. 12 and 13 may be omitted. In addition to the steps shown in FIGS. 12 and 13, other steps may be added, and the order of the steps may vary. Some of the above steps may have their own technical meaning.

The technical features of the present specification described above may be applied to various devices and methods. For example, the above-described technical features of the present specification may be performed/supported through the apparatus of FIGS. 1 and/or 6. For example, the above-described technical features of the present specification may be applied only to a part of FIGS. 1 and/or 6. For example, the technical features of the present specification described above are implemented based on the processing chips 114 and 124 of FIG. 1, or implemented based on the processors 111 and 121 and the memories 112 and 122 of FIG. 1, or, may be implemented based on the processor 610 and the memory 620 of FIG. 6. For example, in the device of the present specification, the processor may be adapted to receive a request to send (RTS) frame, wherein the RTS frame includes bandwidth information; perform a clear channel assessment (CCA) based on the bandwidth information; determine a transport channel based on results of the CCA and information on preconfigured multiple resource units (MRUs); and transmit a clear-to-send (CTS) frame to the transport channel.

The technical features of the present specification may be implemented based on a computer readable medium (CRM). For example, at least one computer readable medium, proposed by the present specification, storing instructions which, based on being executed by at least one processor of a non-access point (AP) station (STA) multi-link device (MLD) in a wireless local area network system, perform operations, the operations comprise: receiving a request to send (RTS) frame, wherein the RTS frame includes bandwidth information; performing clear channel assessment (CCA) based on the bandwidth information; determining a transport channel based on results of the CCA and information on preconfigured multiple resource units (MRUs); and transmitting a clear-to-send (CTS) frame to the transport channel.

The instructions stored in the CRM of the present specification may be executed by at least one processor. At least one processor related to CRM in the present specification may be the processors 111 and 121 or the processing chips 114 and 124 of FIG. 1, or the processor 610 of FIG. 6. Meanwhile, the CRM of the present specification may be the memories 112 and 122 of FIG. 1, the memory 620 of FIG. 6, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims set forth herein may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

Figure 14:
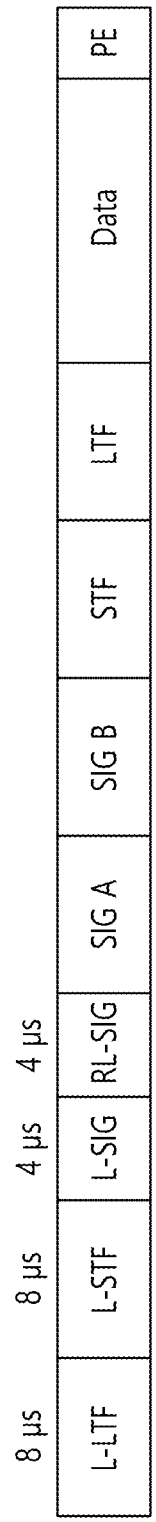
FIG. 14 illustrates another example of a PPDU used in the present specification.

FIG. 14 illustrates another example of a PPDU used in the present specification.

The PPDU depicted in FIG. 14 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields depicted in FIG. 14 may be referred to as various terms. For example, a SIG A field may be referred to an EHT-SIG-A field, a SIG B field may be referred to an EHT-SIG-B, a STF field may be referred to an EHT-STF field, and an LTF field may be referred to an EHT-LTF.

The subcarrier spacing of the L-LTF, L-STF, L-SIG, and RL-SIG fields of FIG. 14 can be set to 312.5 kHz, and the subcarrier spacing of the STF, LTF, and Data fields of FIG. 14 can be set to 78.125 kHz. That is, the subcarrier index of the L-LTF, L-STF, L-SIG, and RL-SIG fields can be expressed in unit of 312.5 kHz, and the subcarrier index of the STF, LTF, and Data fields can be expressed in unit of 78.125 kHz.

The SIG A and/or SIG B fields of FIG. 14 may include additional fields (e.g., a SIG C field or one control symbol, etc.). The subcarrier spacing of all or part of the SIG A (or U-SIG) and SIG B fields may be set to 312.5 kHz, and the subcarrier spacing of the remaining part/fields may be set to 78.125 kHz.

In the PPDU of FIG. 14, the L-LTF and the L-STF may be the same as conventional L-LTF and L-STF fields.

The L-SIG field of FIG. 14 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21,−7, +7, +21} and a DC subcarrier {subcarrier index 0}. As a result, the 48 BPSK symbols may be mapped to subcarrier indices-26 to −22,−20 to −8,−6 to −1, +1 to +6, +8 to +20, and +22 to +26. The transmitting STA may additionally map a signal of {−1,−1,−1, 1} to a subcarrier index {−28,−27, +27, +28}. The aforementioned signal may be used for channel estimation on a frequency domain corresponding to {−28,−27, +27, +28}.

A universal SIG (U-SIG) may be inserted after the RL-SIG of FIG. 14. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIG may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index+28, except for a DC index 0. The 52 BPSK symbols generated by the transmitting STA may be transmitted based on the remaining tones (subcarriers) except for pilot tones, i.e., tones −21,−7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, '000000'.

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

The STF of FIG. 14 may be used to improve automatic gain control estimation in a multiple input multiple output (MIMO) environment or an OFDMA environment. The LTF of FIG. 14 may be used to estimate a channel in a MIMO environment or an OFDMA environment.

The STF of FIG. 14 may be set in various types. For example, the first type of STF (that is, 1× STF) may be generated based on a first type STF sequence in which non-zero coefficients are arranged at 16 subcarrier intervals. The STF signal generated based on the first type STF sequence may have a period of 0.8 μs, and the 0.8 μs period signal may be repeated 5 times to become a first type STF having a length of 4 μs. For example, the second type of STF (that is, 2× STF) may be generated based on a second type STF sequence in which non-zero coefficients are arranged at 8 subcarrier intervals. The STF signal generated based on the second type STF sequence may have a period of 1.6 μs, and the 1.6 μs period signal may be repeated 5 times to become a second type EHT-STF having a length of 8 μs. For example, a third type of STF (ie, 4× EHT-STF) may be generated based on a third type STF sequence in which non-zero coefficients are arranged at intervals of four subcarriers. The STF signal generated based on the third type STF sequence may have a period of 3.2 μs, and the 3.2 μs period signal may be repeated 5 times to become a third type EHT-STF having a length of 16 μs. Only some of the above-described first to third type EHT-STF sequences may be used. In addition, the EHT-LTF field may have first, second, and third types (ie, 1×, 2×, 4× LTF). For example, the first/second/third type LTF field may be generated based on an LTF sequence in which non-zero coefficients are arranged at 4/2/1 subcarrier intervals. The first/second/third type LTF may have a time length of 3.2/6.4/12.8 μs. In addition, GIs of various lengths (eg, 0.8/1/6/3.2 μs) may be applied to the first/second/third type LTF.

Information on the type of STF and/or LTF (including information on GI applied to the LTF) may be included in the SIG A field and/or the SIG B field of FIG. 14.

The PPDU of FIG. 14 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 14. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 14. The PPDU of FIG. 14 may be used to transmit/receive frames of various types. For example, the PPDU of FIG. 14 may be used transmitting for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 14 may be used for transmitting a management frame. An example of the management frame may include a beacon frame, a (re-) association request frame, a (re-) association response frame, a probe request frame, and a probe response frame. For example, the PPDU of FIG. 14 may be used for a data frame. For example, the PPDU of FIG. 14 may be used to simultaneously transmit at least two or more of the control frame, the management frame, and the data frame.

What is claimed is:

1. A method in a wireless local area network (WLAN) system, the method comprising:
   receiving, by a station (STA), an Extremely High Throughput (EHT) physical protocol data unit (PPDU) comprising a Multi-User request to send (RTS) (MU-RTS) trigger frame including a common info field and a user info field,
   wherein the EHT PPDU includes a legacy signal (L-SIG) field, a repeated L-SIG (RL-SIG) field being contiguous to the L-SIG field, and a Universal signal (U-SIG) field being contiguous to the RL-SIG field,
   wherein the L-SIG field includes a length field which is set to a value satisfying a condition that a remainder is zero when the length field is divided by three (3), and the remainder is used to differentiate the EHT PPDU from a High Efficiency (HE) PPDU,
   wherein four extra subcarriers are inserted at indexes of {−28,−27, 27, 28} in the L-SIG field, and values of the four extra subcarriers are {−1,−1,−1, 1}, respectively,
   wherein the U-SIG field has a length of 2 symbols,
   wherein each symbol of the U-SIG field carries 26-bit information, and the U-SIG field comprises version-independent fields followed by version-dependent fields,
   wherein the version-independent fields include first information having a length of 3 bits and related to a physical version, second information related to transmission opportunity (TXOP), third information related to an identifier of a Basic Service Set (BSS), and fourth information having a length of 1 bit and related to whether the EHT PPDU is sent in an uplink (UL) or a downlink (DL),
   wherein the version-dependent fields include fifth information related to a PPDU type which is related to a single-user (SU) transmission or a MU transmission;
   obtaining, by the STA, information related to any punctured 20 MHZ subchannel; and
   in response to the MU-RTS trigger frame, transmitting, by the STA, a clear-to-send (CTS) frame in a resource excluding the any punctured 20 MHz subchannel.

2. A station (STA) in a wireless local area network system, the receiving STA comprising:
   a transceiver for transmitting and receiving a radio signal; and
   a processor coupled to the transceiver, wherein the processor is adapted to,
   receive an Extremely High Throughput (EHT) physical protocol data unit (PPDU) comprising a Multi-User request to send (MU-RTS) trigger frame including a common info field and a user info field,
   wherein the EHT PPDU includes a legacy signal (L-SIG) field, a repeated L-SIG (RL-SIG) field being contiguous to the L-SIG field, and a Universal signal (U-SIG) field being contiguous to the RL-SIG field,
   wherein the L-SIG field includes a length field which is set to a value satisfying a condition that a remainder is zero when the length field is divided by three (3), and the remainder is used to differentiate the EHT PPDU from a High Efficiency (HE) PPDU,
   wherein four extra subcarriers are inserted at indexes of {−28,−27, 27, 28} in the L-SIG field, and values of the four extra subcarriers are {−1,−1,−1, 1}, respectively,
   wherein the U-SIG field has a length of 2 symbols,
   wherein each symbol of the U-SIG field carries 26-bit information, and the U-SIG field comprises version-independent fields followed by version-dependent fields,
   wherein the version-independent fields include first information having a length of 3 bits and related to a physical version, second information related to transmission opportunity (TXOP), third information related to an identifier of a Basic Service Set (BSS), and fourth information having a length of 1 bit and related to whether the EHT PPDU is sent in an uplink (UL) or a downlink (DL),
   wherein the version-dependent fields include fifth information related to a PPDU type which is related to a single-user (SU) transmission or a MU transmission;

obtain information related to any punctured 20 MHz subchannel; and in response to the MU-RTS trigger frame, transmit a clear-to-send (CTS) frame in a resource excluding the any punctured 20 MHz subchannel.

3. The method of claim 1, wherein the STA is a non-access point STA.

4. The method of claim 1, wherein the information related to any punctured 20 MHz subchannel is included in the user info field of the MU-RTS trigger frame.

5. The STA of claim 2, wherein the STA is a non-access point STA.

6. The STA of claim 2, wherein the information related to any punctured 20 MHz subchannel is included in the user info field of the MU-RTS trigger frame.

* * * * *